(12) United States Patent
Gundrum

(10) Patent No.: US 9,896,980 B2
(45) Date of Patent: Feb. 20, 2018

(54) EXHAUST AFTERTREATMENT SUPPLYING A REDUCING AGENT

(75) Inventor: Timothy Joseph Gundrum, Sammamish, WA (US)

(73) Assignee: PACCAR Inc, Bellevue, WA (US)

( * ) Notice: Subject to any disclaimer, the term of this patent is extended or adjusted under 35 U.S.C. 154(b) by 1348 days.

(21) Appl. No.: 13/191,244

(22) Filed: Jul. 26, 2011

(65) Prior Publication Data
US 2013/0025265 A1 Jan. 31, 2013

(51) Int. Cl.
*F01N 3/00* (2006.01)
*F01N 3/20* (2006.01)

(52) U.S. Cl.
CPC ........... *F01N 3/2066* (2013.01); *F01N 3/208* (2013.01); *F01N 2610/02* (2013.01); *F01N 2610/1406* (2013.01); *Y02T 10/24* (2013.01)

(58) Field of Classification Search
USPC .......................................................... 60/295
See application file for complete search history.

(56) References Cited

U.S. PATENT DOCUMENTS

| | | | |
|---|---|---|---|
| 4,602,483 A * | 7/1986 | Wilks et al. ..................... 60/692 |
| 5,121,602 A * | 6/1992 | McCorvey ....................... 60/310 |
| 5,281,403 A | 1/1994 | Jones |
| 5,431,893 A | 7/1995 | Hug |
| 5,502,685 A * | 3/1996 | Orlando ......................... 366/132 |
| 5,601,792 A | 2/1997 | Hug |
| 5,946,763 A * | 9/1999 | Egner-Walter et al. ... 15/250.02 |
| 6,110,435 A | 8/2000 | Lehner |
| 6,192,677 B1 | 2/2001 | Tost |
| 6,203,770 B1 | 3/2001 | Peter-Hoblyn |
| 6,357,227 B1 | 3/2002 | Neufert |
| 6,361,754 B1 | 3/2002 | Peter-Hoblyn |
| 6,722,124 B2 | 4/2004 | Pawson |
| 6,818,127 B1 * | 11/2004 | Ketrow .................... 210/170.03 |
| 6,928,807 B2 | 8/2005 | Jacob |
| 7,467,512 B2 | 12/2008 | Nishina |
| 7,481,986 B2 | 1/2009 | Gabrielsson |
| 7,500,356 B2 | 3/2009 | Hirata |
| 7,509,799 B2 | 3/2009 | Amou |
| 7,617,672 B2 | 11/2009 | Nishina |
| 2002/0023433 A1 * | 2/2002 | Goerigk et al. ................ 60/286 |
| 2002/0081239 A1 | 6/2002 | Palesch |
| 2002/0148221 A1 * | 10/2002 | Jagtoyen et al. ............... 60/309 |
| 2007/0024087 A1 * | 2/2007 | Skopic ........................ 296/180.4 |
| 2007/0028958 A1 * | 2/2007 | Retti ............................. 136/244 |

(Continued)

FOREIGN PATENT DOCUMENTS

| | | |
|---|---|---|
| EP | 1 443 019 A2 | 8/2004 |
| EP | 2 014 348 A2 | 1/2009 |

OTHER PUBLICATIONS

Francella, Barbara. "Eyes on DEF." Convenience Store News. vol. 46, Issue 1, p. 39-40.*

(Continued)

*Primary Examiner* — Mark Laurenzi
*Assistant Examiner* — Mickey France
(74) *Attorney, Agent, or Firm* — Christensen O'Connor Johnson Kindness PLLC

(57) ABSTRACT

The present disclosure relates to on-vehicle systems and methods for mixing an NOx reductant solution from a concentrated source of NOx reductant and water. The mixed DEF is then used to treat exhaust from the vehicle to reduce pollutants.

21 Claims, 5 Drawing Sheets

(56) References Cited

U.S. PATENT DOCUMENTS

| | | |
|---|---|---|
| 2007/0141845 A1* | 6/2007 | Hiraoka et al. ............... 438/692 |
| 2008/0306673 A1 | 12/2008 | Yasui |
| 2009/0031713 A1 | 2/2009 | Suzuki |
| 2009/0115163 A1* | 5/2009 | Winter et al. .............. 280/418.1 |
| 2009/0126347 A1* | 5/2009 | Gabe et al. ..................... 60/285 |
| 2009/0158719 A1 | 6/2009 | Hallstrom |
| 2009/0188565 A1* | 7/2009 | Satake .............................. 137/3 |
| 2009/0272440 A1* | 11/2009 | Levin .............................. 137/59 |
| 2010/0031640 A1* | 2/2010 | Ohashi ............................ 60/286 |
| 2010/0150800 A1 | 6/2010 | Ikeda |
| 2010/0200107 A1* | 8/2010 | Weathers et al. ................. 141/4 |
| 2011/0126514 A1* | 6/2011 | Brammell ....................... 60/274 |

OTHER PUBLICATIONS

Park, Jim. "Road Test: 2010." Today's Trucking. Posted Oct. 9, 2009, retrieved from http://www.todaystrucking.com/road-test-2010.*

* cited by examiner

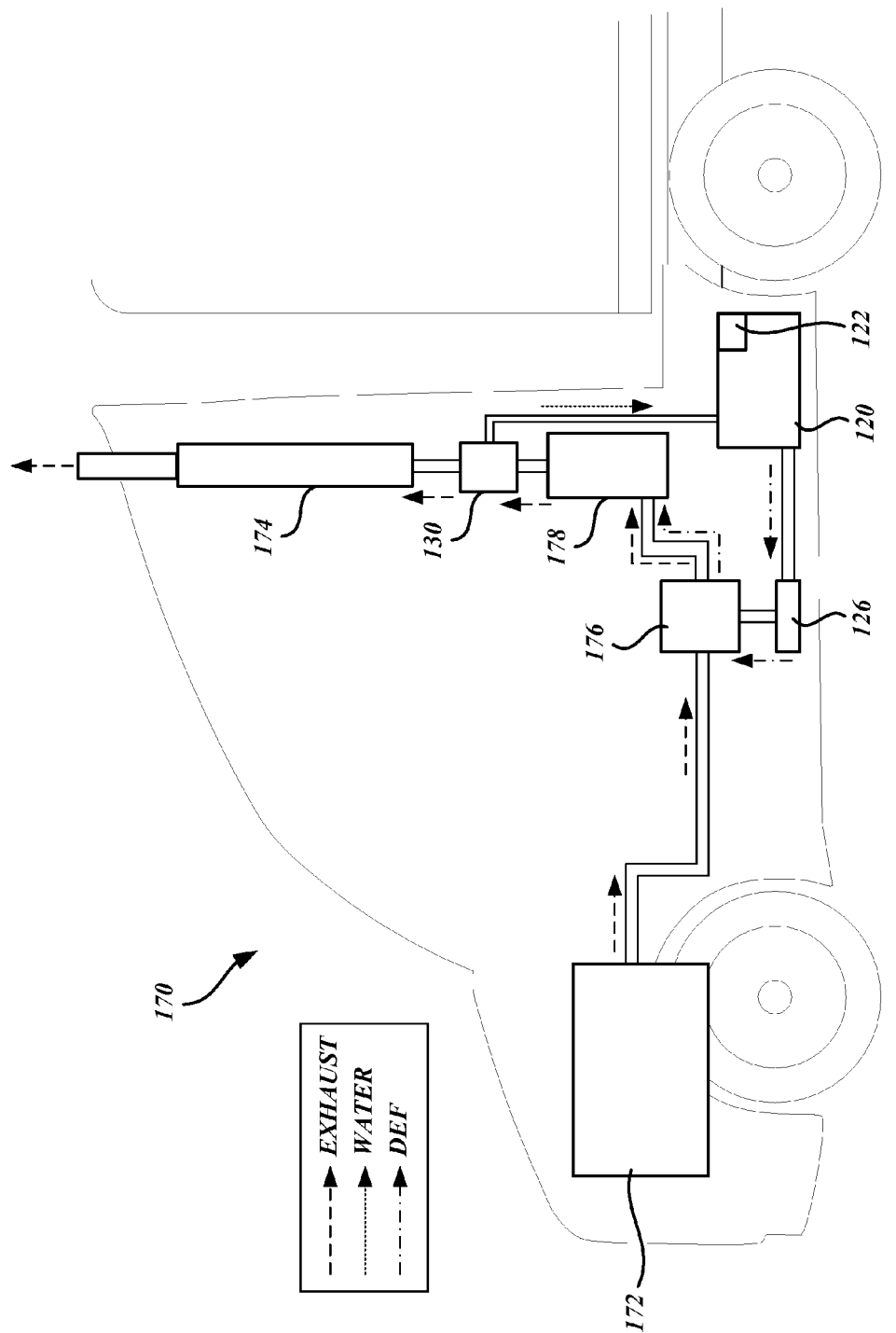

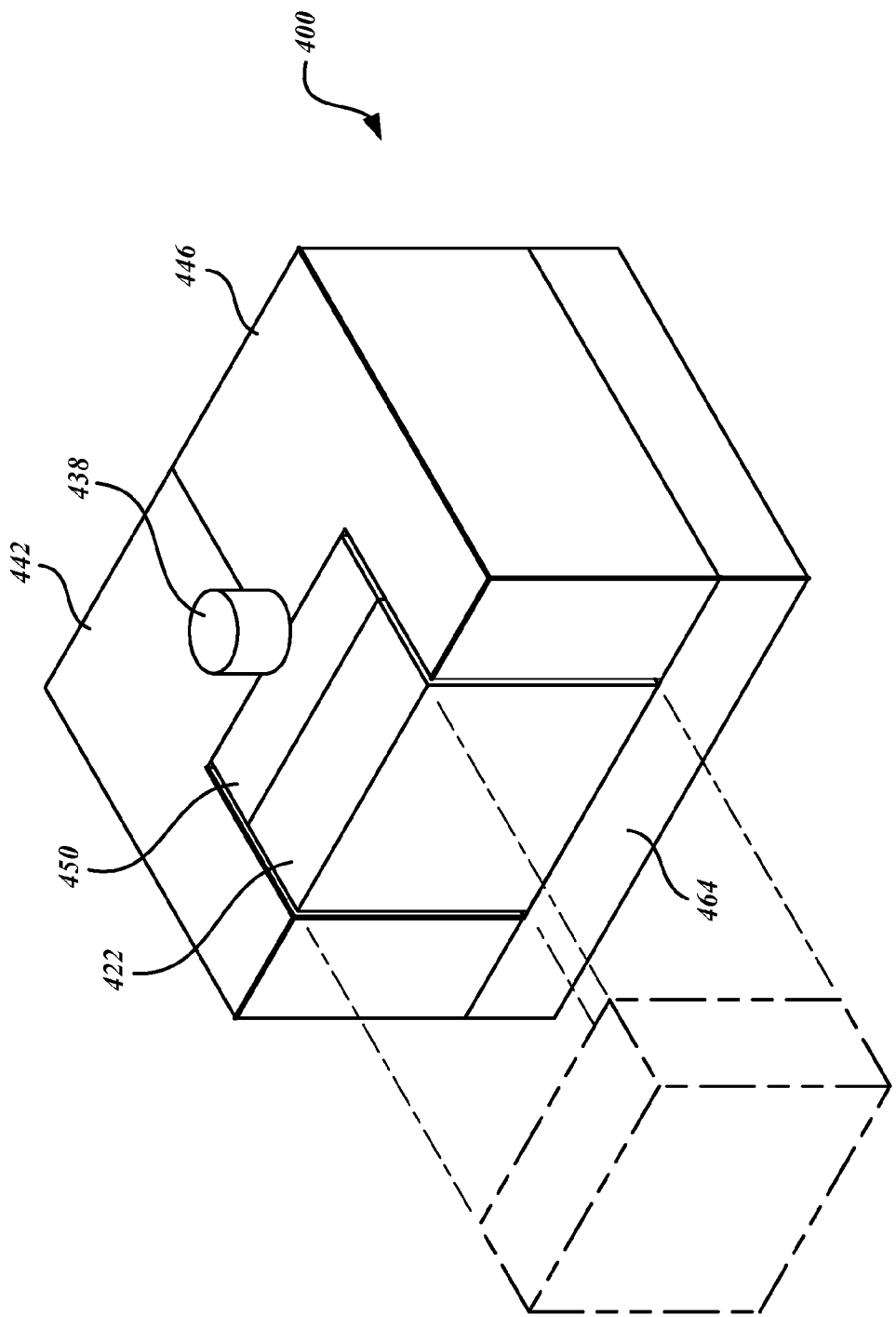

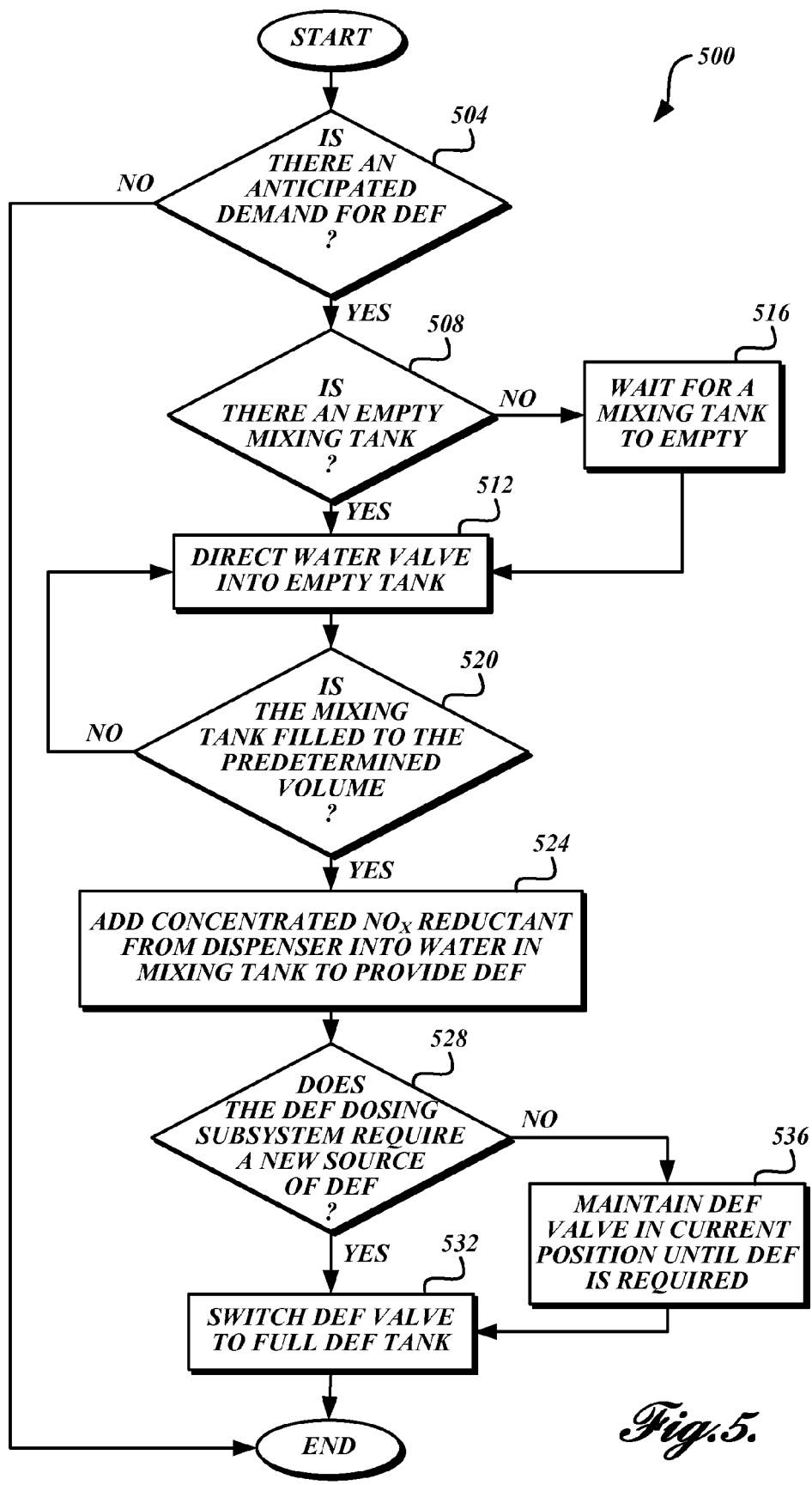

EXHAUST AFTERTREATMENT SUPPLYING A REDUCING AGENT

BACKGROUND

New air-pollution limits for diesel engines have caused some manufacturers to adopt selective catalytic reduction (SCR) technology for reducing pollutants, such as nitrogen oxides (NOx), in engine exhaust. The SCR process introduces an NOx reductant, such as urea, into the exhaust stream from a diesel engine. With the help of a solid-phase catalyst, the NOx reductant chemically reduces NOx within the exhaust into non-pollutant compounds.

Diesel exhaust fluid (DEF) is a term used to describe a standardized solution of an NOx reductant. DEF typically comprises a 32.5% (by weight) solution of high-purity urea in demineralized water.

Present governmental regulations allow for DEF to be manually added to a reservoir in the SCR system (e.g., the DEF reservoir can be refilled frequently, similar to a fuel tank). However, operator refilling of DEF is costly and inconvenient, particularly because not all diesel filling stations have a DEF pump. Accordingly, it is desired to develop a technology that facilitates the refilling of a vehicle DEF supply at normal emission-maintenance intervals (e.g., every 150,000 miles) such that professional technicians are primarily responsible for refilling a DEF supply.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a diesel exhaust fluid (DEF) generating system is provided onboard a vehicle. In one embodiment, the system comprises:
(a) a DEF mixing subsystem comprising a first tank, a second tank, and a dispenser for nitrogen-oxides (NOx) reductant configured to controllably provide concentrated NOx reductant to the first tank and the second tank;
(b) a water source configured to provide water to the first tank, until the first tank is filled to a first fill volume, and then to the second tank; and
(c) a dosing subsystem in fluid communication with the DEF mixing subsystem, wherein the dosing subsystem is configured to receive DEF from the first tank, until the first tank is empty, and then to receive DEF from the second tank.

In another aspect, a method of forming diesel exhaust fluid (DEF) onboard a vehicle having a DEF generating system is provided. In one embodiment, the method comprises:
(a) filling a first tank with water to a predetermined first fill volume;
(b) filling a second tank with water after the first tank is filled to the first fill volume;
(c) dispensing a predetermined first amount of concentrated NOx reductant from a dispenser into the first fill volume of water to provide DEF of a predetermined concentration; and
(d) directing the DEF from the first tank into a DEF dosing system.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 illustrates an exemplary implementation of the DEF generating system as a component of a truck exhaust system of FIGS. 1 and 2;

FIG. 4 is an isometric view of an exemplary embodiment of a DEF mixing subsystem; and FIG. 5 is a diagram of logic performed by a control unit interfaced with a DEF generating system in accordance with the embodiments provided herein.

DETAILED DESCRIPTION

Figure 1:
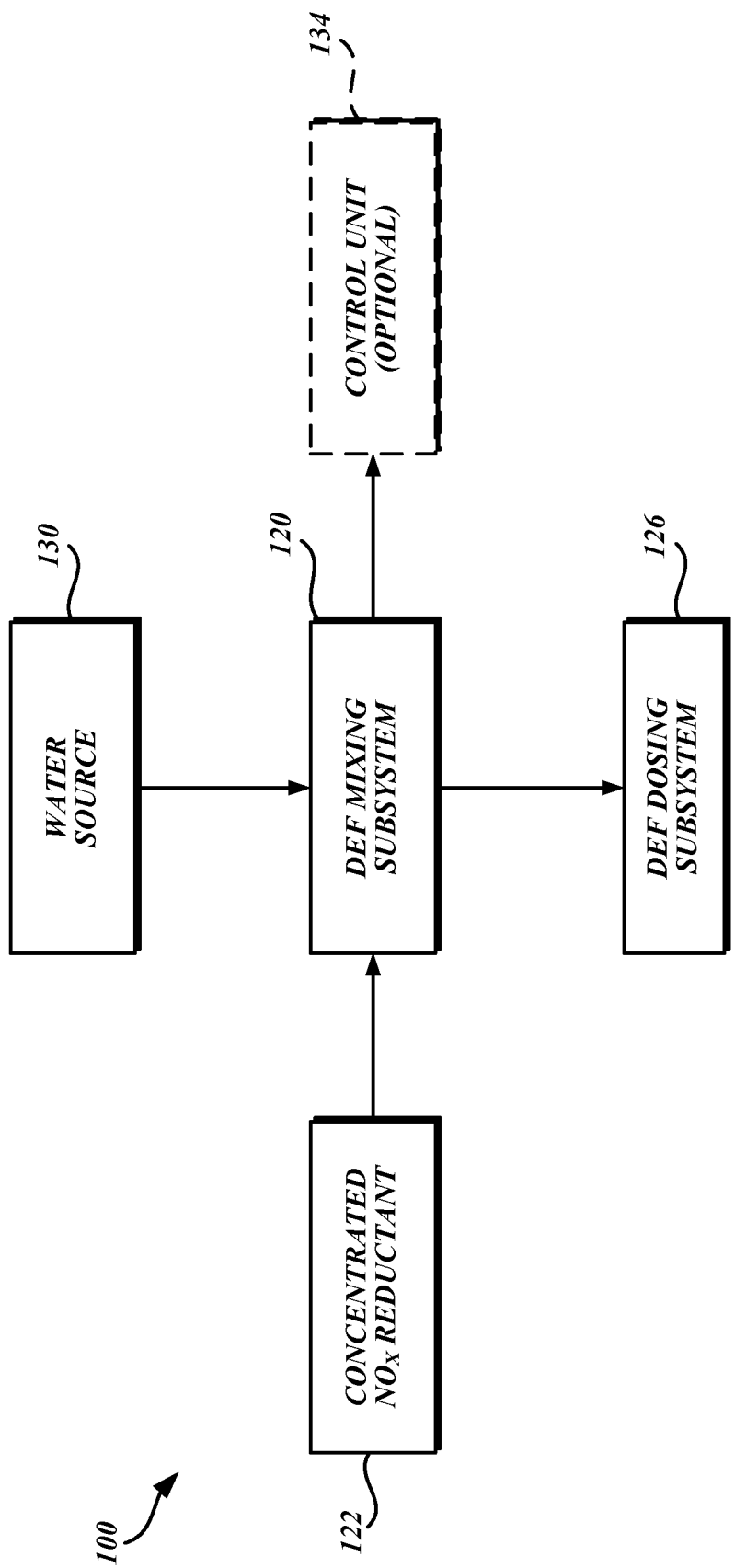
FIG. 1 schematically illustrates an on-vehicle DEF generating system in accordance with embodiments provided herein.

The present disclosure generally relates to on-vehicle systems and methods for mixing an NOx reductant solution ("diesel exhaust fluid" or "DEF") from a concentrated source of NOx reductant and water. The mixed DEF is then used to treat exhaust from the vehicle to reduce pollutants.

Embodiments of the present invention include on-vehicle DEF generation systems. One embodiment of a DEF generation system 100 is illustrated schematically in FIG. 1. The DEF generation system 100 is configured to combine concentrated NOx reductant 122 with a volume of water from a water source 130 in a DEF mixing subsystem 120. A detailed view of the components of the DEF mixing subsystem 120 is illustrated in FIG. 2. Concentrated NOx reductant is combined with water in the DEF mixing subsystem 120 to provide DEF of a desired concentration for use in a DEF dosing subsystem 126.

The DEF generation systems provided herein are particularly useful installed on heavy-duty trucks, such as Class 8 trucks, that utilize selective catalytic reduction (SCR) systems to reduce exhaust pollutants. However, it will be appreciated that aspects of the disclosed subject matter have wide application, and therefore, may be suitable for use with any type of vehicle having a diesel engine, such as passenger vehicles, buses, light, medium, and heavy-duty vehicles, boats, yachts, motor homes, etc. Accordingly, the following descriptions and illustrations herein should be considered illustrative in nature, and thus, not limiting the scope of the claimed subject matter.

The embodiments provided herein are particularly described with regard to the NOx reductant urea, although it will be appreciated that any NOx reductant can be used (e.g., ammonia and other suitable NOx reductants). Additionally, the term "DEF" is used to describe a standard solution of NOx reductant. Present regulations for DEF require the use of a 32.5% solution of urea in demineralized water. However, it will be appreciated that changes to the composition of regulated DEF, as understood by those of skill in the art, are contemplated by the present embodiments. That is, the systems and methods provided can be modified to mix an NOx reductant and water (or an alternative solvent) to any concentration required by a vehicle operator.

Referring again to FIG. 1, in one aspect, the system 100 includes a water source 130. The water source 130 can be water generated on vehicle (e.g., condensed engine exhaust), collected (e.g., rainwater), or manually added (e.g., by a hose). It will be appreciated that two or more sources of water can be used as the water source 130.

In an exemplary embodiment, the water source 130 collects liquid water or water vapor generated by one or more water-producing systems on the vehicle. Exemplary water-producing systems include the engine exhaust system, the compressed air system, and the charge air cooling system. On-vehicle water-producing systems are generally known to those of skill in the art. For example, on-vehicle water-production by an exhaust system is described in U.S. Pat. No. 6,357,227, to Neufert, the disclosure of which is incorporated herein by reference in its entirety. In such a system, a condensation water collector is used, into which exhaust gases are diverted. The collector condenses moisture in the exhaust gas to produce liquid water condensate. In the present disclosure, the condensed moisture of such an engine exhaust water-producing system can be used as the water source 130.

In another exemplary embodiment, the water source 130 includes a rainwater harvesting system mounted to the vehicle. The rainwater harvesting system collects rainwater from one or more surfaces of the vehicle (e.g., roof, hood, and/or windshield). A reservoir can optionally be used as a centralized collection point to store the rainwater.

In yet another exemplary embodiment, the water source 130 is configured to receive water from an off-vehicle source, such as a water faucet (e.g., via a hose). Off-vehicle water is useful when the on-vehicle sources of water are unable to produce sufficient water to mix DEF (e.g., if rainfall is not sufficient or the moisture collection systems are not functioning).

Water from the water source 130 can be transported directly to the DEF mixing subsystem 120 for use as described below. Referring to FIG. 2, an optional water reservoir 160 can be used to collect water prior to distribution of the water to the DEF mixing subsystem 120. A water reservoir 160 is useful, for example, if multiple sources of water (e.g., rainwater harvesting and the exhaust system) are used as the water source 130. The water is then collected in the water reservoir 160 prior to distribution to the DEF mixing subsystem 120. The water reservoir 160 can also be configured to receive water directly from a hose or other off-vehicle water sources.

Water from the water source 130 can optionally be purified to provide the necessary water purity standards required to mix DEF (e.g., demineralized water is typically used to mix DEF). Water from on-vehicle sources (e.g., condensed engine exhaust or rainwater) may need to be purified prior to mixing, due to the typical amount of impurities found in water obtained from these sources. Purification may include filtering, distilling, reverse osmosis, or other techniques known to those of skill in the art.

Referring again to FIG. 1, after collecting water in the water source 130, the water is directed into the DEF mixing subsystem 120. The DEF mixing subsystem 120 combines water and concentrated NOx reductant 122 to provide DEF. The concentrated NOx reductant may be solid, liquid, or a combination of solid and liquid.

Storing NOx reductant in concentrated form reduces the amount of space required to store the NOx reductant on-vehicle and allows for longer vehicle operation between replenishment of the NOx reductant supply. For example, a solid pellet of urea contains an amount of urea that, when mixed into a volume of water, forms a DEF solution of the concentration required for the vehicle SCR system. Accordingly, a relatively large volume of DEF is produced from a relatively small volume of urea (in solid pellet form).

The concentrated NOx reductant 122 is stored on-vehicle, for example, in a container. The storage container is configured according to whether the concentrated NOx reductant is liquid or solid. Concentrated liquid NOx reductant has an NOx reductant concentration greater than the NOx reductant concentration of DEF. When the concentrated NOx reductant is liquid, the container may be a NOx reductant storage tank with a valve controlling fluid communication between the NOx reductant storage tank and the DEF mixing subsystem 120. The valve is operable to provide the desired volume of concentrated NOx reductant solution to the DEF mixing subsystem 120. In certain embodiments, the concentrated liquid NOx reductant is provided at a predetermined volume and is mixed with a predetermined volume of water such that DEF of the desired concentration is provided.

If the concentrated NOx reductant is solid, the container may be a powder or pellet dispenser configured to deliver either a pellet, or a specific amount (e.g., weight or volume) of powdered NOx reductant to the DEF mixing subsystem 120. The solid NOx reductant is provided to the DEF mixing subsystem 120 and mixed with a predetermined volume of water from the water source 130 to provide DEF of the desired concentration.

Figure 2:
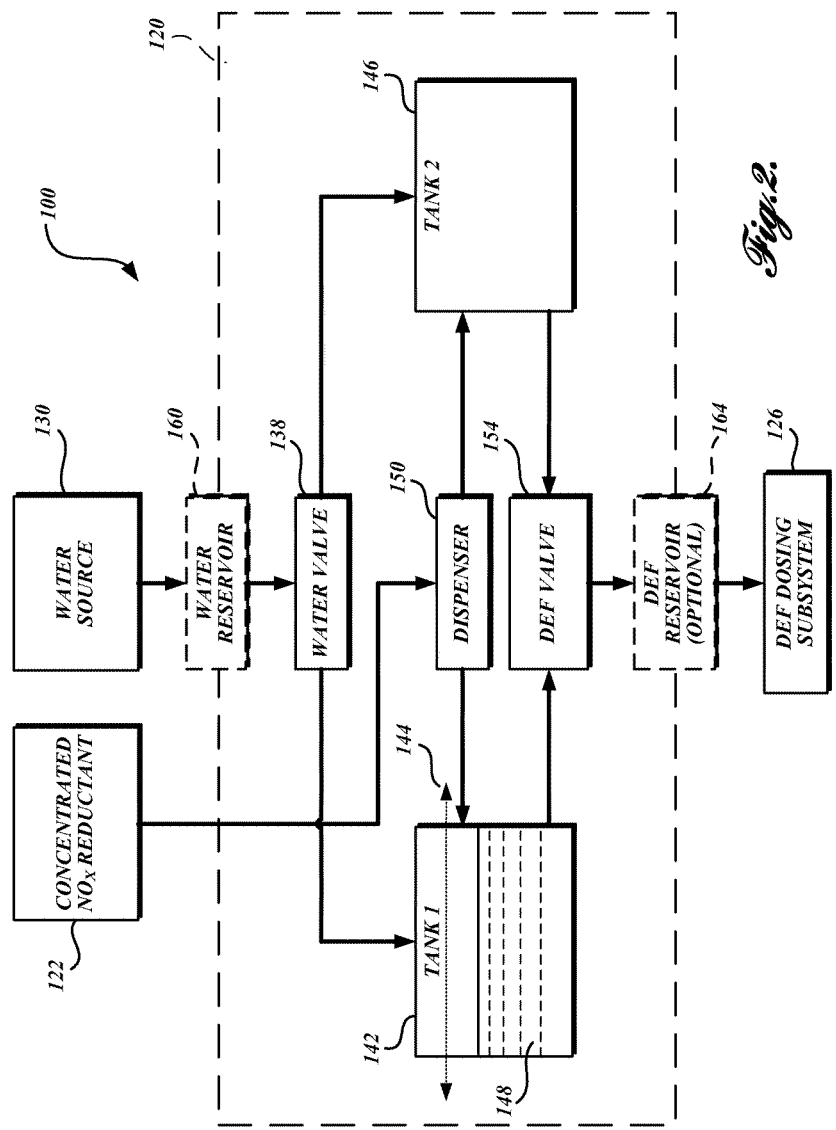
FIG. 2 schematically illustrates the DEF generating system of FIG. 1, including a specific embodiment of a DEF mixing subsystem, in accordance with embodiments provided herein.

Referring to FIGS. 1 and 2, the DEF mixing subsystem 120 combines water from the water source 130 and concentrated NOx reductant 122 to form DEF of a predetermined concentration. The DEF mixing subsystem 120 is designed to provide a continuous supply of DEF to the DEF dosing subsystem 126. In that regard, the DEF mixing subsystem 120 may include two or more mixing tanks, each of which is configured to hold DEF. The tanks are filled sequentially with water from the water source 130, such that only one tank is filling at a time, and the other tank is ready for delivery of DEF. When a tank is filled to a predetermined fill volume, concentrated NOx reductant 122 is dispensed into the tank. Alternatively, the NOx reductant 122 can be added to the tank when empty or during filling. The combined water and NOx reductant form DEF.

In the exemplary DEF mixing subsystem 120 of FIG. 2, a water valve 138 controllably directs water from the water source 130 to either a first tank 142 or a second tank 146. The water valve 138 can be any valve type known to those of skill in the art (e.g., a three-way ball valve).

After the first tank 142 is filled with water 148 to a predetermined volume 144, the water valve 138 switches the water flow from the first tank 142 to the second tank 146, which begins filling towards a second predetermined fill volume. This process is cyclical, as needed to maintain a constant supply of DEF. That is, if the first tank 142 is drained while the second tank 146 is filling, the water valve 138 switches the water flow back to the first tank 142 after the second tank 146 is filled to its predetermined fill volume, and so on. The water valve 138 may also be closed such that no water passes into the DEF mixing subsystem 120, in which case water collected by the water source 130 can be stored in an optional water reservoir 160 until needed, or water can be discharged off-vehicle (e.g., onto the road).

To ensure a constant concentration of DEF, the predetermined fill volume 144 is measured by the DEF mixing subsystem 120 by any method known to those of skill in the art. For example, the weight of the tank can be used to determine the volume of the tank. Alternatively, an optical sensor can be mounted to detect when a tank is filled to a height associated with the predetermined volume. The predetermined fill volume can also be obtained by designing the tanks to only hold the predetermined volume of liquid. In such a design, the tank may have an overflow outlet at a predetermined height that would then cause water to flow out of the tank once the volume reached the predetermined height/volume. The overflow water could be discharged off-vehicle (e.g., onto the road), into a reservoir, or into an empty tank (e.g., the next tank to be filled in sequence).

A dispenser 150 is configured to dispense a predetermined amount of NOx reductant (e.g., solid or liquid) that combines with the predetermined fill volume of water to provide a DEF solution of a desired concentration in the first tank 142 and the second tank 146. The concentrated NOx reductant can be added to the tank prior to filling with water, during filling with water, or after the tank has been filled to the predetermined volume. For example, with reference to FIG. 2, when the first tank 142 reaches the predetermined fill volume 144, concentrated NOx reductant 122 is added to the first tank 142 by the dispenser 150. The dispenser 150 can fill the tanks simultaneously or serially, as needed to form DEF.

The water and NOx reductant are mixed in the first tank 142 to provide DEF. Mixing may occur in several ways, such as diffusion, mechanical agitation (e.g., mixing or stirring), vibration, and other mixing techniques known to those of skill in the art. Multiple mixing mechanisms may be employed.

In certain embodiments, the DEF mixing subsystem 120 includes a mixer configured to mix the water and concentrated NOx reductant. Solution mixers are known to those of skill in the art and include vibratory mixers, mechanical stirrers, magnetic stirrers, and the like. In other embodiments, the DEF mixing subsystem 120 does not include a mixer and the vibrations resulting from vehicle travel are used to mix the water and concentrated NOx reductant to provide DEF.

By serially filling the first tank 142 and then the second tank 146, the system provides the potential for a constant supply of DEF, particularly compared to a system that only has one mixing tank. In the provided system, with at least two tanks, while one tank is filling with water to begin the process of mixing new DEF, another tank that has already mixed DEF can provide DEF to the DEF dosing subsystem 126. Because the process is cyclical, a constant, on-demand, supply of DEF can be provided by switching the flow of water to begin filling a tank when it is empty, and switching the flow of DEF from an emptied tank to one that is full. Accordingly, when one tank is filling with water, the other tank is providing DEF to the DEF dosing subsystem 126. These events can occur at least partially simultaneously.

It should be appreciated that while the embodiments provided herein are described with regard to a first tank 142 and a second tank 146, any number of tanks can be used as long as there is sufficient space on the vehicle to accommodate the tanks. Additionally, the water valve 138, dispenser 150, and DEF valve 154 would be configured to interact with the plurality of tanks, as required to produce and distribute DEF.

As can best be seen in FIGS. 1 and 2, after the DEF mixing subsystem 120 has mixed DEF from the concentrated NOx reductant 122 and water from the water source 130, the DEF is then directed into the DEF dosing subsystem 126. After passing from the DEF mixing subsystem 120, the DEF can then be used as the reductant for SCR in the DEF dosing subsystem 126 of the vehicle. DEF-based SCR dosing systems are well known to those of skill in the art. In certain embodiments, the mixed DEF is directly provided to the DEF dosing subsystem 126 from the DEF mixing subsystem 120.

After the DEF is mixed in the first tank 142, the DEF is routed to the DEF dosing subsystem 126, by way of a DEF valve 154. The DEF valve 154 serially controls the flow of DEF from either the first tank 142 or the second tank 146 to the DEF dosing subsystem 126 (i.e., only one of the tanks is in fluid communication with the DEF dosing subsystem 126 at a given time). Alternatively, the DEF valve 154 can be closed such that no DEF is provided to the dosing subsystem. The DEF valve 154 can be any valve known to those of skill in the art (e.g., a three-way ball valve).

The on-demand, continuous supply system eliminates the need for DEF storage. However, it should be appreciated that a DEF reservoir 164 may be optionally provided intermediate the DEF mixing subsystem 120 and the DEF dosing subsystem 126, as seen in FIG. 2. The DEF reservoir 164 is configured to hold a volume of DEF intermediate the DEF mixing subsystem 120 and the DEF doser subsystem 126.

The DEF reservoir 164 may be optionally configured to receive pre-mixed DEF 128 from an off-vehicle source. For example, a DEF inlet, in fluid communication with the DEF reservoir, can be disposed on-vehicle in an area accessible by a vehicle operator such that pre-mixed DEF can be provided to the DEF reservoir 124 by the operator (e.g., by an off-vehicle DEF pump or bottled DEF). By configuring the system 100 to accept pre-mixed DEF, any failures of the DEF production system 100 in providing DEF (e.g., lack of water or mechanical failure) can be remedied such that the DEF dosing subsystem 126 will still function.

As described with regard to FIG. 2, the control of water, NOX reductant, and DEF is provided by valves and/or dispensers. These valves and dispensers may be generally referred to as "distribution mechanisms." For example, in FIG. 2, the distribution mechanisms include: a water valve 138 that controls the flow of water from the water source 130 to the first tank 142 or the second tank 146; a dispenser 150 that controls the distribution of concentrated NOx reductant 122 to the first tank 142 or the second tank 146; and a DEF valve 154 controls the flow of DEF from either tank one 142 or tank two 146 to the DEF dosing subsystem 126. The control of these distribution mechanisms can be either manual or automated. If the control is manual, an operator controls the distribution of water, NOx reductant, and DEF, as needed to maintain a continuous supply of DEF to the vehicular SCR system (e.g., by a cab-based control panel, or the like).

If one or more of the distribution mechanisms are automated, a control unit 134 can be used to control the DEF mixing subsystem 120 components, as illustrated in FIG. 1. The control unit 134 controls the DEF mixing subsystem 120 and related distribution mechanisms. For example, the control unit 134 can be configured to control the distribution of water, via the water valve 138; concentrated NOx reductant, via the dispenser 150; and/or DEF, via the DEF valve 154, as required to generate and provide DEF to the SCR system via the DEF dosing subsystem 126.

As required to produce DEF, the control unit 134 can be configured to open the water valve 138 to a particular DEF mixing tank (the first tank 142 or the second tank 146). Upon filling, for example, the first tank 142 to a predetermined fill volume 142, the control unit 134 then switches the water valve 138 to direct water form the water source 130 to the second tank 146.

The control unit 134 can also be configured to control the dispensation of concentrated NOx reductant 122 via the dispenser 150 into a mixing tank (the first tank 142 or the second tank 146) to form DEF.

As needed to provide DEF to the DEF dosing subsystem 126, the control unit 134 can also be configured to control the DEF valve 154 to obtain DEF from one of the DEF mixing tanks (the first tank 142 or the second tank 146) at a time. If a DEF reservoir 164 is included in the system, the control unit 134 can also be configured to control the flow of DEF from the DEF mixing tanks (the first tank 142 or the second tank 146) to the DEF reservoir 164, and from the DEF reservoir 164 to the DEF dosing subsystem 126.

Furthermore, the control unit 134 can be operatively coupled to the DEF mixing tanks (the first tank 142 or the second tank 146) in a number of ways. First, the tanks can be monitored for the water volume in each tank. The volume of water in each tank can be communicated to the control unit 134. When the control unit 134 determines that one tank is filled to the predetermined volume 144, the water valve 138 is actuated to shift the flow of water into a different tank. The control unit 134 may also operate to activate any mixing mechanisms used to agitate the water and concentrated NOx reductant in the DEF mixing tanks.

The control unit 134 can be configured to monitor the generation of DEF by monitoring the availability of water in the water source 130, the availability of concentrated NOx reductant 122 (e.g., in an NOx reductant magazine 422, as will be described below with reference to FIG. 4), and the required amount of DEF to be provided to the DEF dosing subsystem 126 (i.e., DEF demand from the DEF mixing subsystem 120).

The control unit 134 described herein is comprised of components known to those of skill in the art. Particularly, a logic device, such as a computer, calculates when to actuate particular distribution mechanisms based on various inputs (e.g., how much DEF the DEF dosing subsystem 126 requires). It should be appreciated that the control unit 134 typically executes logic and operations that may be performed by conventional electronic components. These electronic components, which may be grouped in a single location or distributed over a wide area, generally include processors, memory, storage devices, display devices, input devices, etc. It will be appreciated by one skilled in the art that the logic described herein may be implemented in a variety of configurations, including but not limited to hardware, software, or a combination of hardware and software. In circumstances where the components are distributed, the components are accessible to each other via communication links.

Referring now to FIG. 3, an exemplary implementation of the DEF system of FIGS. 1 and 2 is shown. In that regard, a truck 170 having a DEF generation system is illustrated. The truck 170 includes a traditional exhaust system wherein an engine 172 produces exhaust that is ultimately expelled through an exhaust stack 174. First, the exhaust is routed from the engine 172 to a mixing pipe 176 where a DEF doser sprays DEF into the exhaust. The DEF doser may be powered by a DEF dosing pump that is part of an exemplary DEF dosing subsystem 126, as illustrated in FIGS. 1 and 2. The DEF dosing subsystem 126 is provided DEF by a DEF mixing subsystem 120 that mixes water from a water source 130 and source of concentrated NOx reductant 122.

The exhaust, combined with DEF, travels from the mixing pipe 176 to the SCR catalyst 178, wherein NOx pollutants in the exhaust are eliminated through chemical reduction at the catalyst by combining the exhaust stream and DEF.

The water source 130 for the DEF mixing subsystem 120 is then provided, in this exemplary embodiment, from the exhaust stream using an exhaust moisture collection system, as described above. After water has been collected from the exhaust it proceeds to the exhaust stack 174.

In the truck 170 illustrated in FIG. 3, the DEF mixing subsystem 120 essentially replaces what is a DEF storage tank on present Class 8 trucks having an SCR system. By replacing a standard DEF tank with a DEF mixing subsystem 120, a replenishable supply of DEF is provided to the truck such that a DEF supply need not be refilled as frequently. The concentrated NOx reductant may be provided from a container 122 and the water is provided by the water collection unit 130. It will be appreciated that other water sources can also be used that are not illustrated in FIG. 3, such as a rain water collection system and other systems for harvesting water from on-vehicle, as described herein.

Referring now to FIG. 4, an alternate embodiment of a DEF mixing subsystem 400 is illustrated. The system 400 shown in FIG. 4 is substantially similar to the system of FIGS. 1-3, except for the inclusion of a DEF reservoir 464, as will be described in more detail below. Like elements of the embodiment of FIG. 4 have like numbers of the embodiments of FIGS. 1-3, but in the 400 series. The DEF mixing subsystem 400 includes a first tank 442 and a second tank 446 configured to receive water from a water valve 438. A dispenser 450 is configured to dispense solid NOx reductant to each of the first tank 442 and the second tank 446. A removable NOx reductant container/magazine 422 is interfaced with the dispenser 450 so as to provide a supply of NOx reductant. A DEF reservoir 464 is provided for storing DEF mixed in either the first tank 442 or the second tank 446. The DEF reservoir 464 controllably receives DEF from a valve (not illustrated) that controllably distributes DEF from either the first tank 442 or the second tank 4446. The DEF from the reservoir 464 is distributed to the DEF dosing subsystem via a DEF valve (not illustrated).

During operation of the DEF mixing subsystem 400, water is directed from a water source (e.g., water source 130) into the first tank 442 by the water valve 438. When the first tank 442 is filled to a predetermined fill volume, the water is combined with an NOx reductant pellet from the magazine 422 dispensed by the dispenser 450. The pellet and water are then mixed together in the first tank 442 to form DEF of the desired concentration. The DEF valve then releases the mixed DEF into the reservoir 464. DEF from the reservoir 464 can then be provided to the DEF dosing system (e.g., dosing subsystem 126) as described herein.

After water has been provided to the predetermined volume in the first tank 442, the water valve 438 then switches to redirect water into the second tank 446, which begins filling towards a predetermined fill volume. As with the first tank 442, after the second tank 446 reaches a predetermined fill volume, a DEF pellet is provided from the magazine 422 by the dispenser 450 into the second tank 446 to provide DEF of the desired concentration. The mixed DEF in the second tank 446 can then be provided to the reservoir 464, or can be stored in the tank 446 until the reservoir 464 is drained sufficiently to accommodate the volume of DEF in the second tank 446. If the first tank 442 is emptied after the second tank 446 is filled to the predetermined fill volume, the water valve 438 then switches again to redirect water into the first tank 442 to begin filling to the predetermined fill volume. The process then repeats as necessary to meet DEF demand.

The DEF mixing subsystem 400 illustrates one benefit of the systems provided herein in that the NOx reductant magazine 422 provides a compact concentrated source of NOx reductant that is easily replenished by removing an empty magazine and installing a full magazine. It will be appreciated that while the DEF mixing subsystem 400 is described with regard to NOx reductant pellets, the concentrated NOx reductant can also be in tablet, powder, concentrated liquid, or other forms known to those of skill in the art.

Furthermore, the reservoir 464 provides the additional benefit of storing DEF intermediate the mixing tanks 442 and 446 and prior to use in the DEF dosing system. The use of such a reservoir 464 allows for a vehicle to hold a larger volume of DEF at any given time when compared to an embodiment where only a first tank 442 and a second tank 446 are used.

Turning now to FIG. 5, a logic diagram is illustrated that provides a representative routine 500 for operating the DEF mixing subsystem 120 that can be implemented in the control unit 134 (see FIG. 1). It will be appreciated that the logic diagram of FIG. 5 can be implemented in any system described herein with regard to FIGS. 1-4.

The routine 500 begins with block 504, wherein it is determined if there is an anticipated demand for DEF. The anticipated demand for DEF in block 504 is not necessarily confined to determining if there is an immediate need for DEF (e.g., there is no DEF available for the DEF dosing subsystem 126 at the present time). Instead, the routine 500 can estimate if there will be an anticipated demand for DEF some time in the future such that, given known DEF usage conditions, DEF should be provided at a certain volume so as to meet anticipated demand.

If there is an anticipated demand for DEF, the routine 500 proceeds to block 508. If there is no anticipated demand for DEF, the routine ends.

At block 508, it is determined if there is an empty mixing tank (e.g., is the first tank 142 or the second tank 146 empty). This determination is made based on a sensor input (e.g., a weight-based or optical sensor) indicating whether or not there is water in a given tank. If it is determined that a tank is empty, the routine 500 proceeds to block 512. If it is determined that there is no empty mixing tank, the routine 500 proceeds to block 516 wherein the routine waits for a mixing tank to empty and then proceeds to block 512.

At block 512, the water valve 138 directs water into an empty tank.

The routine 500 then proceeds to block 520 where it is determined if the tank is filled with water to a predetermined volume. The predetermined volume can be determined by a sensor or other mechanism, as described elsewhere herein. If it is determined that the predetermined volume of water has not been reached, the routine 500 then reverts back to block 512 until it is determined that the predetermined volume of water has been reached in block 520.

When the predetermined volume of water has been reached, the routine 500 proceeds to block 524, wherein concentrated NOx reductant from the dispenser is added into the water in the mixing tank to provide DEF. It will be appreciated that the concentrated NOx reductant can be dispensed prior to the water in the tank reaching the predetermined volume, as well.

The routine then proceeds to block 528 where it is determined if the DEF dosing subsystem 126 requires a new source of DEF. Block 528 is a determination as to whether or not DEF is immediately needed by the DEF dosing subsystem 126, or if the DEF mixed in the tank should be held in reserve until it is required. For example, if the DEF dosing subsystem 126 is drawing DEF mixed in the first tank 142, DEF can be mixing in the second tank 146, such that when the DEF mixed in the first tank 142 is depleted, the DEF dosing subsystem 126 can then receive the mixed DEF from the second tank 146 as necessary.

If it is determined that the DEF dosing subsystem 126 requires a new source of DEF, the routine 500 proceeds to block 532, wherein the DEF valve 164 is switched to a full tank of DEF to provide a source of DEF to the DEF dosing subsystem 126. The routine then ends.

If it is determined at block 528 that the DEF dosing subsystem does not require a new source of DEF immediately, the routine 500 proceeds to block 536, wherein the DEF valve 164 is maintained in its current position until DEF is required by the DEF dosing subsystem 126. When DEF is required by the DEF dosing subsystem 126, the routine proceeds to block 532 and then ends.

It will be appreciated that the routine 500 described herein is a representative routine executable in the control unit 134. Modifications can be made to the routine 500 without departing from the spirit and scope of the routine or the intended outcome, which is to provide a constant on-demand source of DEF to a DEF dosing subsystem wherein the DEF is sourced on vehicle from an on-vehicle water source and a concentrated supply of NOx reductant.

The routine 500 can be executed using any technology known to those of skill in the art. For example, the routine 500 can be executed on electronic hardware (e.g., a computer) using computer-executable instructions.

While illustrative embodiments have been illustrated and described, it will be appreciated that various changes can be made therein without departing from the spirit and scope of the invention.

The embodiments of the invention in which an exclusive property or privilege is claimed are defined as follows:

1. A diesel-powered vehicle exhaust fluid (DEF) generating system, the system comprising:
(a) a diesel exhaust fluid (DEF) mixing subsystem comprising a first tank, a second tank, and a nitrogen-oxides (NOx) reductant dispenser configured to controllably provide concentrated NOx reductant to the first tank and the second tank;
(b) a water source configured to provide water to the first tank, until the first tank is filled to a first fill volume, and then to the second tank; and
(c) a dosing subsystem in fluid communication with the DEF mixing subsystem, wherein the dosing subsystem is configured to receive DEF from the first tank, until the first tank is empty, and then to receive DEF from the second tank,
wherein the DEF mixing subsystem, the water source, and the dosing subsystem are onboard the diesel-powered vehicle.

2. The system of claim 1, wherein the water source includes a rainwater harvesting system.

3. The system of claim 1, wherein the water source is a water collection system configured to collect water from a vehicle mechanical system selected from the group consisting of an engine exhaust system, a compressed air system, a charge air cooling system, and combinations thereof.

4. The system of claim 1, further comprising a water reservoir intermediate and in fluid communication with the water source and the DEF mixing subsystem.

5. The system of claim 4, wherein the water reservoir is configured to receive water from an off-vehicle source of water.

6. The system of claim 1, wherein the concentrated NOx reductant is selected from the group consisting of solid urea, liquid urea, and a combination thereof.

7. The system of claim 1, wherein the DEF mixing subsystem further comprises a mixer configured to mix water and concentrated NOx reductant in the first tank to produce DEF.

8. The system of claim 1, wherein the DEF dosing subsystem comprises a DEF reservoir in controllable fluid communication with the first tank, the second tank, and the DEF dosing subsystem.

9. The system of claim 8, wherein the DEF reservoir is configured to receive DEF from an off-vehicle source of DEF.

10. The system of claim 1, wherein the dosing subsystem is configured to receive DEF from the first tank at least partially simultaneously while the second tank is provided with water from the water source.

11. The system of claim 1, further comprising a water purification system intermediate and in fluid communication with the water source and the DEF mixing subsystem.

12. The system of claim 1, wherein the DEF mixing subsystem is configured to provide DEF of a predetermined concentration, wherein the dispenser is configured to provide a predetermined first amount of concentrated NOx reductant to the first tank, and wherein the mixing subsystem is configured to receive a predetermined first volume of water from the water source into the first tank, such that when the predetermined first amount of concentrated NOx reductant is combined with the predetermined first volume of water, DEF of the predetermined concentration is produced.

13. The system of claim 1, further comprising a water valve that controllably directs water from the water source serially into the first tank and then the second tank.

14. The system of claim 1, further comprising a DEF valve that controllably directs DEF into the DEF dosing subsystem serially from the first tank and then the second tank.

15. The system of claim 1, further comprising a control unit configured to operate one or more of the dispenser, a water valve that controllably directs water from the water source serially into the first tank and then the second tank, and a DEF valve that controllably directs DEF into the DEF dosing subsystem serially from the first tank and then the second tank.

16. A method of forming diesel exhaust fluid (DEF) onboard a diesel-powered vehicle having a DEF-generating system, the method comprising:
   (a) filling a first tank with water to a predetermined first fill volume;
   (b) filling a second tank with water after the first tank is filled to the first fill volume;
   (c) dispensing a predetermined first amount of concentrated NOx reductant from a NOx reductant dispenser into the first fill volume of water of the first tank and the second tank to provide DEF of a predetermined concentration; and
   (d) directing the DEF from the first tank into a DEF dosing system until the first tank is empty and then directing DEF from the second tank into the DEF dosing system.

17. The method of claim 16, wherein the steps of directing the DEF from the first tank into the DEF dosing system and filling the second tank with water occur at least partially simultaneously.

18. The method of claim 16, further comprising the step of refilling the first tank with water from a water source after the first tank is emptied of DEF.

19. The method of claim 16, wherein the step of filling the second tank with water after the first tank is filled to the first fill volume comprises switching a water valve.

20. The method of claim 16, wherein the step of directing the DEF from the first tank into the DEF dosing system comprises switching a DEF valve.

21. The system of claim 1, wherein the DEF mixing subsystem is configured to replace a DEF storage tank.

* * * * *